(12) United States Patent
Hongo et al.

(10) Patent No.: US 10,310,494 B2
(45) Date of Patent: Jun. 4, 2019

(54) DIAGNOSTIC RESULT DISPLAY METHOD IN DIAGNOSTIC DEVICE AND DIAGNOSTIC DEVICE

(71) Applicant: Okuma Corporation, Niwa-Gun (JP)

(72) Inventors: Takumi Hongo, Niwa-Gun (JP); Hitoshi Sumi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 15/701,667

(22) Filed: Sep. 12, 2017

(65) Prior Publication Data

US 2018/0120827 A1    May 3, 2018

(30) Foreign Application Priority Data

Oct. 27, 2016 (JP) ................. 2016-210849

(51) Int. Cl.
*G08B 5/00* (2006.01)
*G05B 23/02* (2006.01)
*G06T 11/00* (2006.01)

(52) U.S. Cl.
CPC ........ *G05B 23/0272* (2013.01); *G06T 11/001* (2013.01)

(58) Field of Classification Search
CPC .......................... G05B 23/0272; G06T 11/001
USPC .................................... 340/815.65
See application file for complete search history.

(56) References Cited

U.S. PATENT DOCUMENTS

| | | | | |
|---|---|---|---|---|
| 5,995,910 A * | 11/1999 | Discenzo | ............ | G01M 13/045 702/34 |
| 2008/0133439 A1* | 6/2008 | Ikeda | ............... | G01H 1/003 706/20 |
| 2009/0030545 A1* | 1/2009 | Masuya | ............... | B23Q 17/12 700/175 |
| 2009/0299663 A1* | 12/2009 | Butz | ............... | G01M 13/045 702/56 |
| 2010/0114806 A1* | 5/2010 | Harrison | ............... | G06N 20/00 706/14 |
| 2012/0097411 A1* | 4/2012 | Yoshino | ............... | B23Q 17/10 173/176 |
| 2012/0109360 A1* | 5/2012 | Nishimura | ......... | B23Q 11/0032 700/180 |
| 2013/0053722 A1* | 2/2013 | Carlson | ............... | A61B 5/7264 600/554 |
| 2013/0110406 A1* | 5/2013 | Kwon | ............... | G16H 50/20 702/19 |
| 2014/0288692 A1* | 9/2014 | Kawashima | ..... | G05B 19/40937 700/160 |
| 2016/0026773 A1* | 1/2016 | Chu | ............... | A61J 1/03 705/2 |

(Continued)

FOREIGN PATENT DOCUMENTS

JP         4736613 B2      7/2011
JP    2012-199928 A1     10/2012

*Primary Examiner* — Zhen Y Wu
(74) *Attorney, Agent, or Firm* — Burr & Brown, PLLC

(57) ABSTRACT

A diagnostic result display method in a diagnostic device calculates a diagnostic result by a determination of a predetermined state and a certainty factor of the determination. The diagnostic result display method includes setting preset predetermined colors to predetermined states, setting a preset area of a geometric shape according to certainty factors, and displaying the area of the geometric shape in at least one of the predetermined colors.

2 Claims, 4 Drawing Sheets

| CERTAINTY FACTOR  DETERMINATION | ~20% | ~40% | ~60% | ~80% | ~100% |
|---|---|---|---|---|---|
| NORMAL | ◉ | ◉ | ◉ | ◉ | ◉ |
| ABNORMAL | ◉ | ◉ | ◉ | ◉ | ◉ |

(56) References Cited

U.S. PATENT DOCUMENTS

| | | | |
|---|---|---|---|
| 2016/0116899 A1* | 4/2016 | Piner | G05B 19/404 |
| | | | 700/173 |
| 2016/0288285 A1* | 10/2016 | Piner | B23Q 15/12 |
| 2016/0346891 A1* | 12/2016 | Ando | G05B 19/404 |
| 2017/0067796 A1* | 3/2017 | Kawada | G01M 13/04 |
| 2018/0043492 A1* | 2/2018 | Ando | B23Q 17/007 |
| 2018/0058250 A1* | 3/2018 | Reigl | F01D 21/003 |
| 2018/0354088 A1* | 12/2018 | Matsushita | B23Q 15/12 |

\* cited by examiner

| SITE | MAIN SPINDLE | X-AXIS | Y-AXIS | Z-AXIS |
|---|---|---|---|---|
| DIAGNOSTIC RESULT |  |  |  |  |

FIG.3

| CERTAINTY FACTOR / DETERMINATION | ~20% | ~40% | ~60% | ~80% | ~100% |
|---|---|---|---|---|---|
| NORMAL | ◉ | ◉ | ◉ | ◉ | ◉ |
| ABNORMAL | ◉ | ◉ | ◉ | ◉ | ◉ |

DIAGNOSTIC RESULT DISPLAY METHOD IN DIAGNOSTIC DEVICE AND DIAGNOSTIC DEVICE

BACKGROUND

This application claims the benefit of Japanese Patent Application Number 2016-210849 filed on Oct. 27, 2016, the entirety of which is incorporated by reference.

TECHNICAL FIELD

The disclosure relates to a diagnostic result display method that displays a diagnostic result in a diagnostic device, and to the diagnostic device that includes a display means for the diagnostic result and is disposed in, for example, a machine tool to diagnose the machine tool for, for example, presence/absence of an abnormality.

RELATED ART

There has been known a machine such as a machine tool, a management system including this machine, and a similar system that include a diagnostic device to diagnose the machine for normality/abnormality of an operating state and display the diagnostic result.

For example, Japanese Unexamined Patent Application Publication No. 2012-199928 discloses a management system that manages a plurality of network apparatuses and a plurality of management target information processing apparatuses, detects an abnormality in a communication path, calculates a certainty factor regarding certainty of the cause of the abnormality, and displays the certainty factor by percentage.

Japanese Patent No. 4736613 discloses a management system for a production line that displays goodness of fit indicative of a degree of meeting a condition leading to a failure and a certainty factor of goodness of fit by values and signs according to contents of an answer from a user for a failure result.

The conventional disclosures numerically display the certainty factor of normality/abnormality and the degree thereof, and these displays make it difficult for an operator to intuitively grasp the diagnostic result.

Therefore, an object of the disclosure is to provide a diagnostic result display method in a diagnostic device and the diagnostic device that, in addition to a determination of a state such as normal/abnormal states, is allowed to intuitively grasp a certainty factor of determination and a degree of the state.

SUMMARY

In order to achieve the above-described object, there is provided a diagnostic result display method in a diagnostic device according to a first aspect of the disclosure. The diagnostic device calculates a diagnostic result by a determination of a predetermined state and a certainty factor of the determination. The diagnostic result display method may include setting predetermined colors to predetermined states, setting a preset area of a geometric shape according to certainty factors, and displaying the area of the geometric shape in at least one of the predetermined colors.

In order to achieve the above-described object, there is provided a diagnostic result display method in a diagnostic device according to a second aspect of the disclosure. The diagnostic device calculates a diagnostic result by a determination of a predetermined state and a degree of the state. The diagnostic result display method may include setting predetermined colors to predetermined states, setting a preset area of a geometric shape to degrees of the states, and displaying the area of the geometric shape in at least one of the predetermined colors.

In order to achieve the above-described object, there is provided a diagnostic device according to a third aspect of the disclosure. The diagnostic device calculates a diagnostic result by a determination of a predetermined state and a certainty factor of the determination. The diagnostic device may include a diagnostic result display means. The diagnostic result display means may be configured to set predetermined colors to predetermined states. The diagnostic result display means may be configured to set a preset area of a geometric shape according to certainty factors. The diagnostic result display means may be configured to display the area of the geometric shape in at least one of the predetermined colors.

In order to achieve the above-described object, there is provided a diagnostic device according to a fourth aspect of the disclosure. The diagnostic device calculates a diagnostic result by a determination of a predetermined state and a degree of the state. The diagnostic device may include a diagnostic result display means. The diagnostic result display means may be configured to set predetermined colors to predetermined states. The diagnostic result display means may be configured to set a preset area of a geometric shape according to the degrees of the states. The diagnostic result display means may be configured to display the area of the geometric shape in at least one of the predetermined colors.

With the embodiment, the predetermined colors are set to the predetermined states, the preset area of the geometric shape is set according to the certainty factors or the degrees, and the area of the geometrical shape is displayed in at least one of the predetermined colors. Thus, the machine state and the certainty factor or the degree can be simultaneously displayed. Accordingly, for example, in addition to the determination of the state such as the normal/abnormal, the certainty factor or the degree can also be intuitively grasped.

BRIEF DESCRIPTION OF THE DRAWINGS

FIG. 3 is an explanatory view illustrating meanings of the display.

DETAILED DESCRIPTION

The following describes an embodiment of the disclosure based on the drawings.

Figure 1:
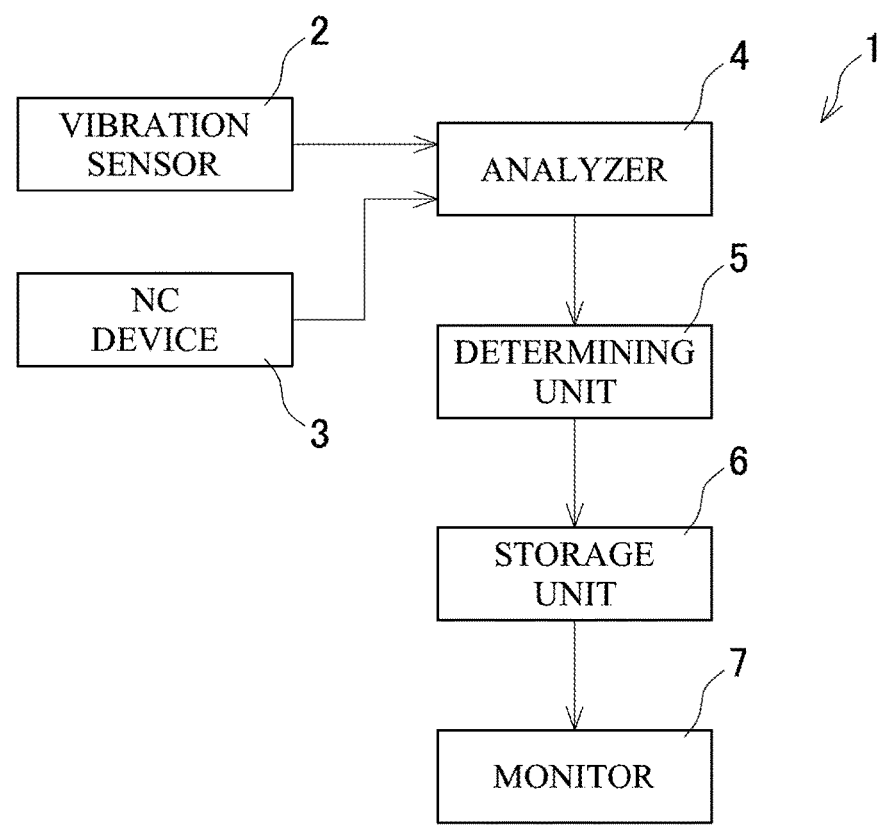
FIG. 1 is a schematic diagram of a diagnostic device in a machine tool.

FIG. 1 is a schematic diagram illustrating one example of a diagnostic device in a machine tool.

Figure 2:
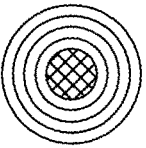
FIG. 2 is an explanatory view illustrating a display example of a diagnostic result in a monitor.
Figure 2:
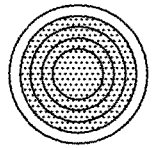
Figure 2:
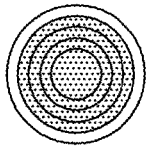
Figure 2:
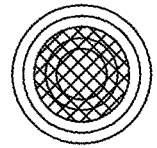

A diagnostic device 1 has a function of individually diagnosing a main spindle as a main unit and feed axes (an X-axis, a Y-axis, and a Z-axis). With respect to the main spindle, an analyzer 4 analyzes a detection signal from a vibration sensor 2 disposed near a bearing inside a main spindle housing, and a determining unit 5 determines a state (normal or abnormal) and the certainty factor. In the feed axes, the analyzer 4 analyzes torque information to control servo motors obtained from an NC (numerical control)

device 3. The determining unit 5 calculates the determination of the state and the certainty factor of the determination through a neural network and machine learning such as deep learning. A storage unit 6 stores the calculated state and certainty factor, and a monitor 7 displays the calculated state and certainty factor as a diagnostic result as illustrated in FIG. 2. These determining unit 5 and monitor 7 serve as a diagnostic result display means.

The determining unit 5 calculates the certainty factor of the determination of the machine state (normal, abnormal) by a value of 0 to 100%. As illustrated in FIG. 3, the monitor 7 shows the determination of a normal or abnormal state by differentiating a color tone (in the drawing, the color difference is shown by using dots for a normal state and meshes for an abnormal state). The certainty factor is distinguished by a size (an area) of a circle set in increments of 20%. The state and the certainty factor are simultaneously displayed.

As illustrated in FIG. 2, it can be understood from the display example of the monitor 7 where the diagnostic result of the spindle is "abnormal" and the certainty factor is 20%, the diagnostic result of the X-axis is "normal" and the certainty factor is 80%, the diagnostic result of the Y-axis is "normal" and the certainty factor is 80%, and the diagnostic result of the Z-axis is "abnormal" and the certainty factor is 60%.

Figure 4:
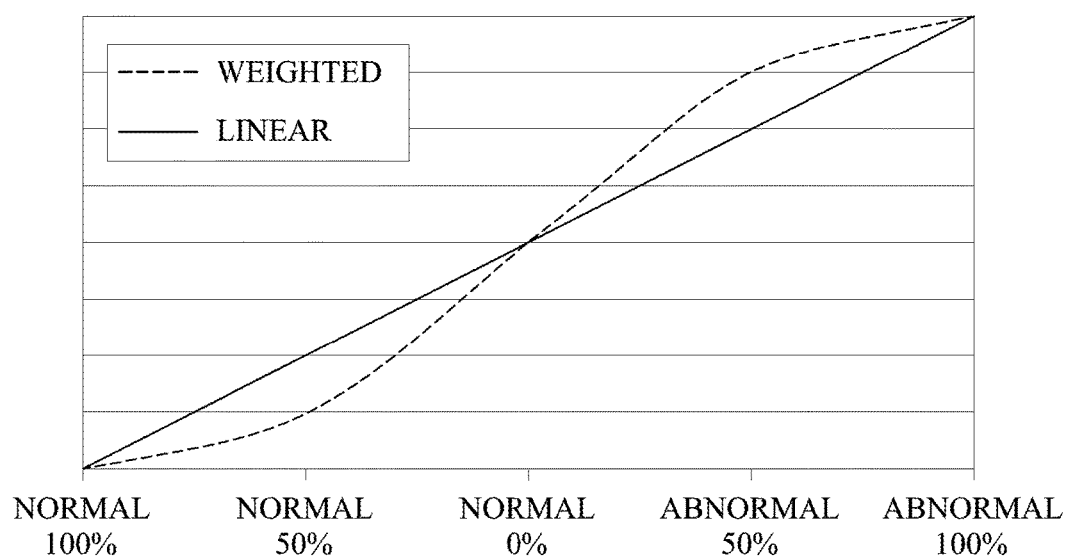
FIG. 4 is a graph illustrating a relationship between vibration values and determination results.

In the main spindle, a vibration value in a major error possibly causing a unfavorable condition in the operation itself is set as a threshold. The value is set as "100% abnormal", while a vibration value immediately after the production is set as "100% normal." A change between the set values may be, for example, linearly interpolated by the solid line as shown in FIG. 4, or may be obtained by a formula or by a curved line on which weighting indicated by the dotted line is performed.

As explained above, the diagnostic result display method according to the diagnostic device 1 with the configuration sets the predetermined colors to the normality and the abnormality to be determined, sets the preset sizes of the area of the circle as the certainty factors of the determination, and displays the area of the circle in the predetermined color. Accordingly, the machine state (normal, abnormal) and the certainty factor can be simultaneously displayed. In addition to the two-valued determination result such as the normality/abnormality, the certainty factor can also be intuitively obtained by an operator.

While the configuration displays the certainty factor of the determination by the size of the circle, the determining unit 5 can determine "a degree" of the determined state (for example, a degree of normal and abnormal) and the monitor 7 can similarly display the results by the size of the circle. The increments of the degree of certainty factor and the area are not limited to 20% but can also be appropriately increased and decreased. For example, the increments may be fine further or may be uneven increments, and the area is not changed up to 50% and is finely incremented from 50% or more for display.

Geometric shapes displaying the certainty factor and the degree are not limited to a circle but a quadrangle, a triangle, a polygon, and a similar shape are applicable. The configuration is not limited to the one that changes the area in a concentric manner. For example, using a color of a scale and scale markings of the quadrangle or a similar shape set in increments of 20%, the state, the certainty factor, and the degree can be simultaneously displayed.

Furthermore, the configuration performs the two-valued determination of normal and abnormal as the predetermined states. Meanwhile, for example, when there are a plurality of abnormalities desired to be distinguishably displayed, three colors or more can be set for each of the states and the respective certainty factors and degrees can be displayed by the area. Further, the determination is not limited to the two-valued determination. Therefore, the state determined by the diagnostic device is not limited to normal and abnormal.

The disclosure is not limited to machine tool but is also applicable to another machine and a system that includes a plurality of machines including the diagnostic device.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A diagnostic result display method in a diagnostic device disposed in a machine tool that calculates a diagnostic result by a determination of a predetermined state, and a certainty factor of the diagnostic result, the diagnostic result display method comprising:
   analyzing information obtained from at least a sensor disposed in the machine tool and a numerical control device with an analyzer;
   sensing a vibration of a main spindle of the machine tool with a vibration sensor disposed in the machine tool;
   analyzing the sensed vibration of the main spindle of the machine tool with an analyzer disposed in the machine tool;
   analyzing torque information of at least one of x, y, and z feed axes with the analyzer;
   utilizing the torque information to control a servo motor obtained from the numerical control device;
   calculating with a determining unit, the determining unit including at least a neural network, one of a normal state or an abnormal state of at least one of the main spindle or at least one of the x, y, and z feed axes, and a certainty factor thereof;
   setting predetermined colors to predetermined states;
   setting a preset area of a geometric shape according to certainty factors; and
   displaying the area of the geometric shape in at least one of the predetermined colors.

2. A diagnostic result display method in a diagnostic device disposed in a machine tool that calculates a diagnostic result by a determination of a predetermined state, a certainty factor of the diagnostic result, and a degree of the state, the diagnostic result display method comprising:
   analyzing information obtained from at least a sensor disposed in the machine tool and a numerical control device with an analyzer disposed in the machine tool;
   sensing a vibration of a main spindle of the machine tool with a vibration sensor disposed in the machine tool;
   analyzing the sensed vibration of the main spindle of the machine tool with the analyzer disposed in the machine tool;
   analyzing torque information of at least one of x, y, and z feed axes with the analyzer;
   utilizing the torque information to control a servo motor obtained from the numerical control device;

calculating with a determining unit, the determining unit including at least a neural network, one of a normal state or an abnormal state of at least one of the main spindle or at least one of the x, y, and z feed axes, and a certainty factor thereof;

setting predetermined colors to predetermined states;

setting a preset area of a geometric shape according to at least one of degrees of states or at least one of the certainty factors; and displaying the area of the geometric shape in at least one of the predetermined colors.

\* \* \* \* \*